United States Patent
Choi

(10) Patent No.: US 9,083,556 B2
(45) Date of Patent: Jul. 14, 2015

(54) SYSTEM AND METHOD FOR DETECTNG MALICIOUS MAIL FROM SPAM ZOMBIES

(75) Inventor: Thomas Choi, Mountain View, CA (US)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 1240 days.

(21) Appl. No.: 11/850,340

(22) Filed: Sep. 5, 2007

(65) Prior Publication Data

US 2008/0301809 A1 Dec. 4, 2008

Related U.S. Application Data

(60) Provisional application No. 60/941,013, filed on May 31, 2007.

(51) Int. Cl.
G06F 15/173 (2006.01)
H04L 12/58 (2006.01)
H04L 29/06 (2006.01)

(52) U.S. Cl.
CPC .............. H04L 12/585 (2013.01); H04L 51/12 (2013.01); H04L 65/1076 (2013.01)

(58) Field of Classification Search
CPC .......................... H04L 65/1076; H04L 12/585
USPC .................. 709/204–207, 223–226; 726/1–3, 726/22–25
See application file for complete search history.

(56) References Cited

U.S. PATENT DOCUMENTS

| 6,161,130 | A * | 12/2000 | Horvitz et al. ................. 709/206 |
| 6,732,149 | B1 * | 5/2004 | Kephart ......................... 709/206 |
| 6,732,157 | B1 * | 5/2004 | Gordon et al. ................. 709/206 |
| 7,366,919 | B1 * | 4/2008 | Sobel et al. ..................... 726/23 |
| 7,409,708 | B2 * | 8/2008 | Goodman et al. ............... 726/13 |
| 7,529,802 | B2 * | 5/2009 | Nelson et al. .................. 709/206 |
| 7,536,552 | B2 * | 5/2009 | Touitou et al. ................. 713/170 |
| 7,548,544 | B2 * | 6/2009 | Quinlan et al. ................. 370/392 |
| 2004/0068542 | A1 * | 4/2004 | Lalonde et al. ............... 709/206 |
| 2004/0260922 | A1 * | 12/2004 | Goodman et al. ............. 713/154 |
| 2005/0080642 | A1 * | 4/2005 | Daniell ............................ 705/1 |
| 2005/0091321 | A1 * | 4/2005 | Daniell et al. ................. 709/206 |
| 2006/0168041 | A1 * | 7/2006 | Mishra et al. .................. 709/206 |
| 2006/0288076 | A1 * | 12/2006 | Cowings et al. ............... 709/206 |
| 2007/0143469 | A1 * | 6/2007 | Adams et al. .................. 709/224 |

(Continued)

OTHER PUBLICATIONS

Kuhnast, Charley. "Bot Posse: An insidious spam botnet attacks Charley", www.linux-magazine.com. Aug. 2006. pp. 69-70.*
Spamhaus, http://www.spamhaus.org/organization/ (last visited Apr. 18, 2012).*
Newton's Telecom Dictionary, 18th ed., Feb. 2002.*
Merriam Webster, http://www.merriam-webster.com/dictionary/parse (last visited Apr. 18, 2012).*

(Continued)

*Primary Examiner* — Brendan Higa
(74) *Attorney, Agent, or Firm* — Anderson Gorecki & Rouille LLP

(57) ABSTRACT

In recent years, the use of spam zombies has become a preferred method of sending spam. In fact, it is estimated that over 90% of all spam comes from spam zombies. Although existing spam zombie detection mechanisms such as the Spamhaus XBL blacklist exist, these techniques are limited in that they cannot block spam from newly created spam zombies. The present invention relates to a system and method for detecting malicious e-mails from spam zombies, the system comprising a processor operable to process a server identification value of a sending source by separating the value into one or more domain level terms to allow each unique term to be tokenized with an index value and to apply the one or more tokenized values as a learning feature in a learning algorithm trained to identify spam zombies.

17 Claims, 7 Drawing Sheets

(56) References Cited

U.S. PATENT DOCUMENTS

| | | | |
|---|---|---|---|
| 2007/0204026 A1* | 8/2007 | Berger | 709/223 |
| 2007/0282955 A1* | 12/2007 | Lin et al. | 709/206 |
| 2008/0005316 A1* | 1/2008 | Feaver et al. | 709/224 |
| 2008/0028463 A1* | 1/2008 | Dagon et al. | 726/22 |

OTHER PUBLICATIONS

Merriam Webster, http://www.merriam-webster.com/dictionary/embed (last visited Apr. 18, 2012).*

* cited by examiner

SYSTEM AND METHOD FOR DETECTNG MALICIOUS MAIL FROM SPAM ZOMBIES

CROSS REFERENCE TO RELATED APPLICATIONS

This application claims the benefit of priority of U.S. Provisional Patent Application No. 60/941,013 filed May 31, 2007, which is incorporated herein by reference.

FIELD OF INVENTION

The present invention relates to e-mail filtering systems, and in particular, to a system and method for filtering malicious messages from spam zombies.

BACKGROUND

E-mail is an efficient form of communication that has become widely adopted by both individuals and organizations. Today, more and more people are relying on e-mail to connect them with their friends, family, colleagues, customers and business partners. Unfortunately, as e-mail usage has evolved, so too has its threats. In particular, spam, which is also known as unsolicited bulk e-mail, has become an increasingly difficult threat to detect and continues to be getting worse.

One reason behind this increase in spam is the growing usage of spam zombies to deliver spam. Specifically, according to industry metrics, approximately 90% of all spam comes from spam zombies. A spam zombie is an end-user system that has been compromised by malware where malware is defined as any software program developed for the purpose of causing harm to a computer system, similar to a virus or trojan horse. Once malware is installed on the system, an attacker such as a spammer is able to use the compromised system as a spam distribution channel without the knowledge of the system owner.

Spam zombies have become a preferred means of sending spam because they allow spammers to use other people's resources to send spam, they protect the spammer's identity and they can overcome existing anti-spam filtering techniques. For example, a fresh supply of spam zombies can overcome spam-zombie specific filtering techniques such as the Spamhaus eXploits Block List (XBL) blacklist. Since spam zombies are known to generate a large amount of spam upon creation, it is possible that a large volume of spam can get through a filter that utilizes blacklists.

As such, there is a need to improve existing spam zombie detection mechanisms to detect spam from spam zombies and more particularly, the implementation of a technique for list generalization.

SUMMARY

The present invention seeks to obviate or mitigate at least one of the above-mentioned problems.

According to one aspect of the present invention there is provided a system for detecting malicious e-mails from spam zombies, the system comprising a processor operable to process a server identification value of a sending source by separating the value into one or more domain level terms to allow each unique term to be tokenized with an index value and to apply the one or more tokenized values as a learning feature in a learning algorithm trained to identify spam zombies.

According to a second aspect of the present invention, there is provided a method for detecting malicious e-mails from spam zombies, the method comprising the steps of processing a server identification value of a sending source by separating the value into one or more domain level terms, tokenizing each domain level term with an index value and applying the one or more tokenized values as a learning feature in a learning algorithm trained to identify spam zombies.

An advantage of the present invention is that it allows existing mail filters to learn the behaviour of spam zombies and generalize this to new spam zombies. Therefore, even new spam zombies that are not on a blacklist can still be successfully detected.

Other aspects and features of the present invention will become apparent to those ordinarily skilled in the art upon review in conjunction with the accompanying figures.

DESCRIPTION OF DRAWINGS

Embodiments of the present invention will now be described, by way of example only, with reference to the attached Figures, wherein.

DETAILED DESCRIPTION

Figure 1:
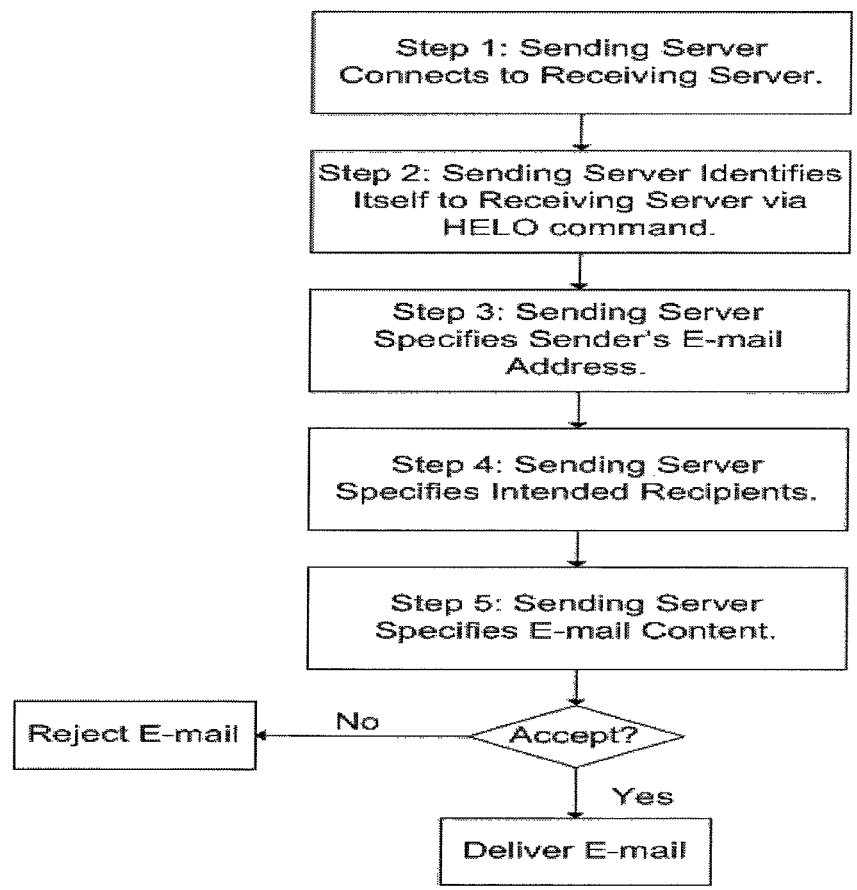
FIG. 1 is a block diagram modeling legitimate SMTP transaction according to RFC 2821.

Referring to FIG. 1, a transactional flow of a legitimate or RFC2821 compliant mail server is illustrated as comprising the following five steps: START->HELO->MAIL FROM->RCPT TO->DATA. When comparing the transactional flow illustrated in FIG. 1 with spam zombie behaviour, it was observed that the transactional flow of a spam zombie is distinct from that of a legitimate mail source. For example, at the HELO state of an RFC2821 compliant Simple Mail Transfer Protocol (SMTP) transactional flow, a legitimate mail server typically identifies itself to the receiving mail server with its fully qualified domain name. If the server does not have a fully qualified domain name, then it may use an address literal. Spam zombies however were found to use either a random string as their identifier or simply forge the identifier to pretend that it came from a forged source server. With legitimate server identification being either a fully qualified domain name or an address literal and said identification values being sufficiently distinguishable from the identification values from zombies, it was possible to develop a generic pattern for such behaviour. Consequently, according to one embodiment of the prevention invention, there is a machine-learning algorithm that is capable of learning the server identification values of both legitimate mail servers and spam zombies. Such machine-learning algorithm may comprise of any existing supervised learning algorithms such as the single perceptron, multi-layer neural networks and Bayesian.

Figure 2:
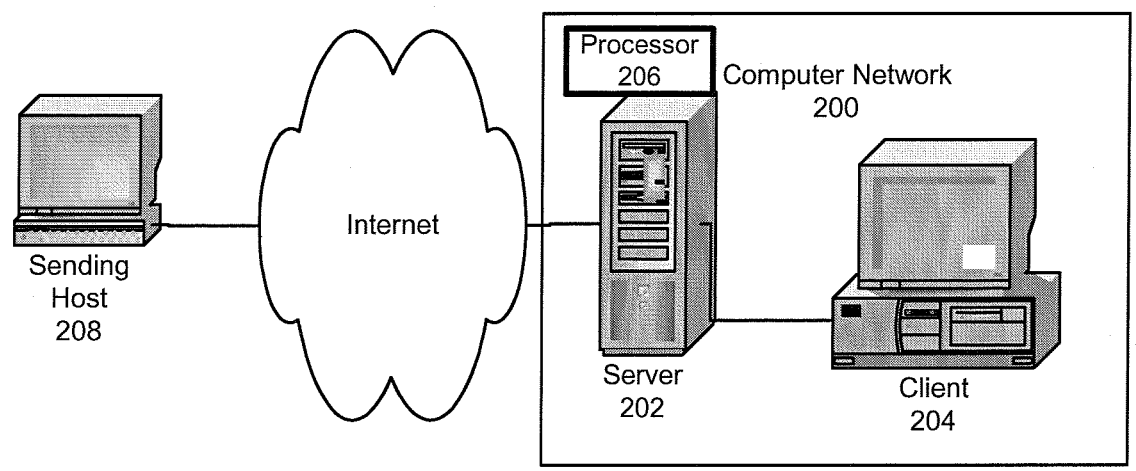
FIG. 2 is a block diagram of a computer network including a sending host for sending a electronic communication to a client computer, according to an embodiment of the present invention.

Referring to FIG. 2, a typical communications network context within which the invention is applicable includes a server computer 202 and client computer 204 connected through or forming part of a computer network 200. The server computer 202 may be, for example, a mail filtering server. The computer network 200 may be, for example, a corporate or internet service providing network. Outside of the network, there exists at least one sending host 208 in communication with the client computer 204 via server computer 202. The server computer 202 is electronically linked to a processor 206 that determines whether to accept or filter certain electronic communications from message sending servers such as the sending host 208. Specifically, the processor processes the server identification value of the sending servers such as the sending host 208 and applies the processed value into a trained learning algorithm.

Figure 3:
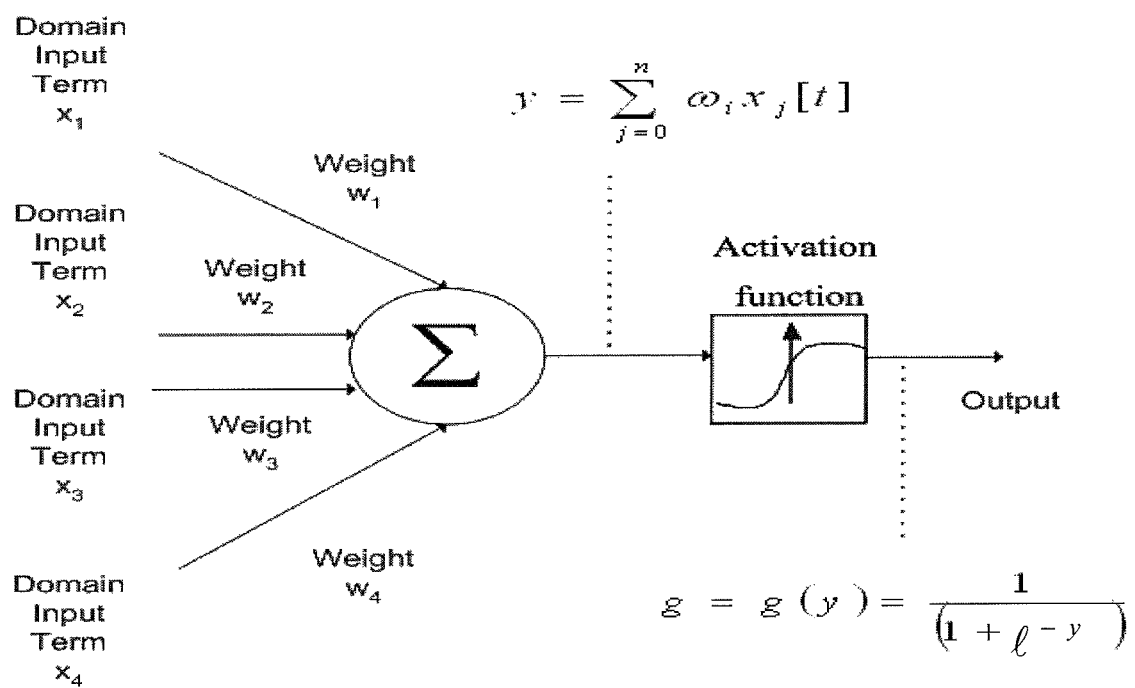
FIG. 3 is a block diagram of a perceptron machine learning algorithm according to an embodiment of the invention.

The structure of one such learning algorithm, the single perceptron, comprises a neuron having a set number of inputs with corresponding weights, which are used to calculate the most likely classification of input data. Specifically, each input value is multiplied by a corresponding weight and applied to the input of the neuron. The neuron then computes the sum of all its inputs and then applies the sum to an activation function to determine an output value. The activation function can be a linear or non-linear function. According to an alternate embodiment of the present invention, the perceptron of FIG. 3, comprises four input values and a single output value where each input value is a tokenized representation of a domain level term of the sending server's identification value and the output value is produced by an activation function such as the sigmoid function. In an alternate embodiment of the present invention, the perceptron may have any number of inputs.

To help ensure that an attacker cannot easily overcome the new machine learning technique via forging, additional checks are included in the present embodiment of the invention. In particular, the present embodiment of the invention prevents spam zombies from forging fully qualified domain names by performing a reverse DNS look-up on their IP address and verifying that their reverse DNS value closely matches the server identification value they provided. It should be noted that reverse DNS entries are typically the fully qualified domain name of the IP address and are stored on a DNS supplied by either the user or their service provider. In other words, it is non-trivial for an attacker to compromise a user's machine and alter their reverse DNS. The added reverse DNS check also prevents spam zombies from forging and improperly using an address literal as its identification value by verifying that the sending source is RFC 2821 compliant. Specifically, the check verifies that the source does not have a reverse DNS mapping and that the sending server IP address matches the IP address in the address literal.

Figure 4:
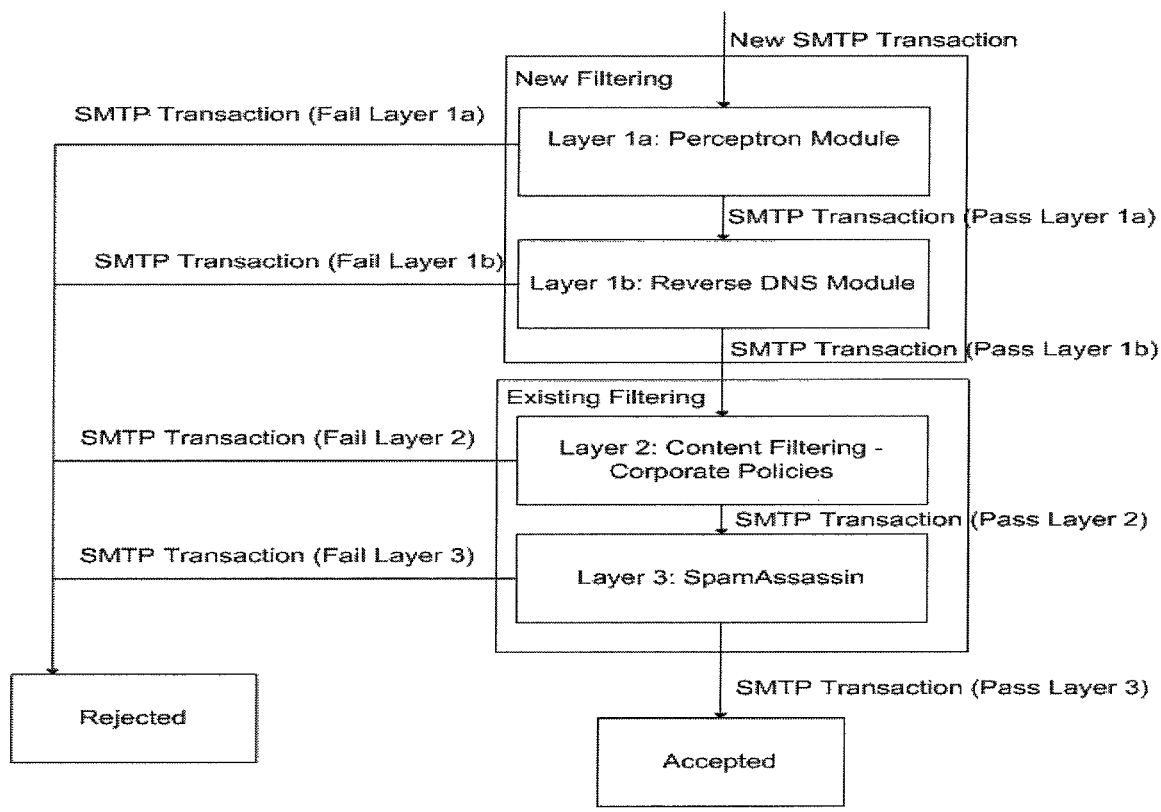
FIG. 4 is a block diagram representing the integration of filtering techniques according to an embodiment of the invention.

Referring to FIG. 4, the machine learning algorithm and reverse DNS checks according to the present embodiment of the present invention, are integrated with an existing corporate spam filtering solution and applied on a server such as server 202. The processor 206 is responsible for processing the machine learning algorithm and reverse DNS checks according to the algorithms previously described. This processing comprises the first of three filtering layers of the corporate filtering solution, where each of the three layers must be passed sequentially in order for the filtering server to relay the message to the intended recipient.

The first layer, identified as Layer 1a in FIG. 4, is the machine-learning algorithm, which determines whether the sending server's identification value is considered legitimate or illegitimate. If the value is considered illegitimate, the algorithm rejects the SMTP transaction. If however, the value is considered legitimate then the SMTP transaction is then checked against a Reverse DNS module, identified as Layer 1b in FIG. 4. In the Reverse DNS module, the reverse DNS of the sending server is queried to verify that the sending server's identification value is consistent with RFC 2821. If the value is inconsistent with RFC 2821 then the Reverse DNS module rejects the transaction. One advantage of using the Reverse DNS module is to prevent spammers from simply forging server identification values. Again, it should be noted that the machines learning algorithm and reverse DNS checks may be applied as the only layer of filtering in a filtering system or may alternatively be integrated with any number of layers in a multi-layer filter.

In the event that the server identification value is considered legitimate by both the machine-learning algorithm and reverse DNS module then the machine-learning algorithm is re-trained. First, a check is performed with a bad supervisor, in this case the Spamhaus XBL to determine if the sending server's IP address is listed in said list. If the sending server's IP address is listed then the perceptron's expected output is set to indicate SPAM (i.e. 1) and the perceptron is trained to learn that the server identification value is indicative of spam zombie behaviour. In addition to the Spamhaus XBL lookup, each SMTP transaction is sequentially scanned against a second (i.e. content filtering comprising corporate policy rules) and third (i.e. SpamAssassin) layer of spam filtering, identified as Layers 2 and 3 respectively in FIG. 4. If the SMTP transaction is able to pass both the second and third layers and the sending server's IP address was not listed in the Spamhaus XBL, then the expected output of the new perceptron is set to NON-SPAM (i.e. 0) by a good supervisor. Using said expected output, the new perceptron is then trained to learn that the server identification value that was received is not indicative of spam zombie behaviour.

Figure 5:
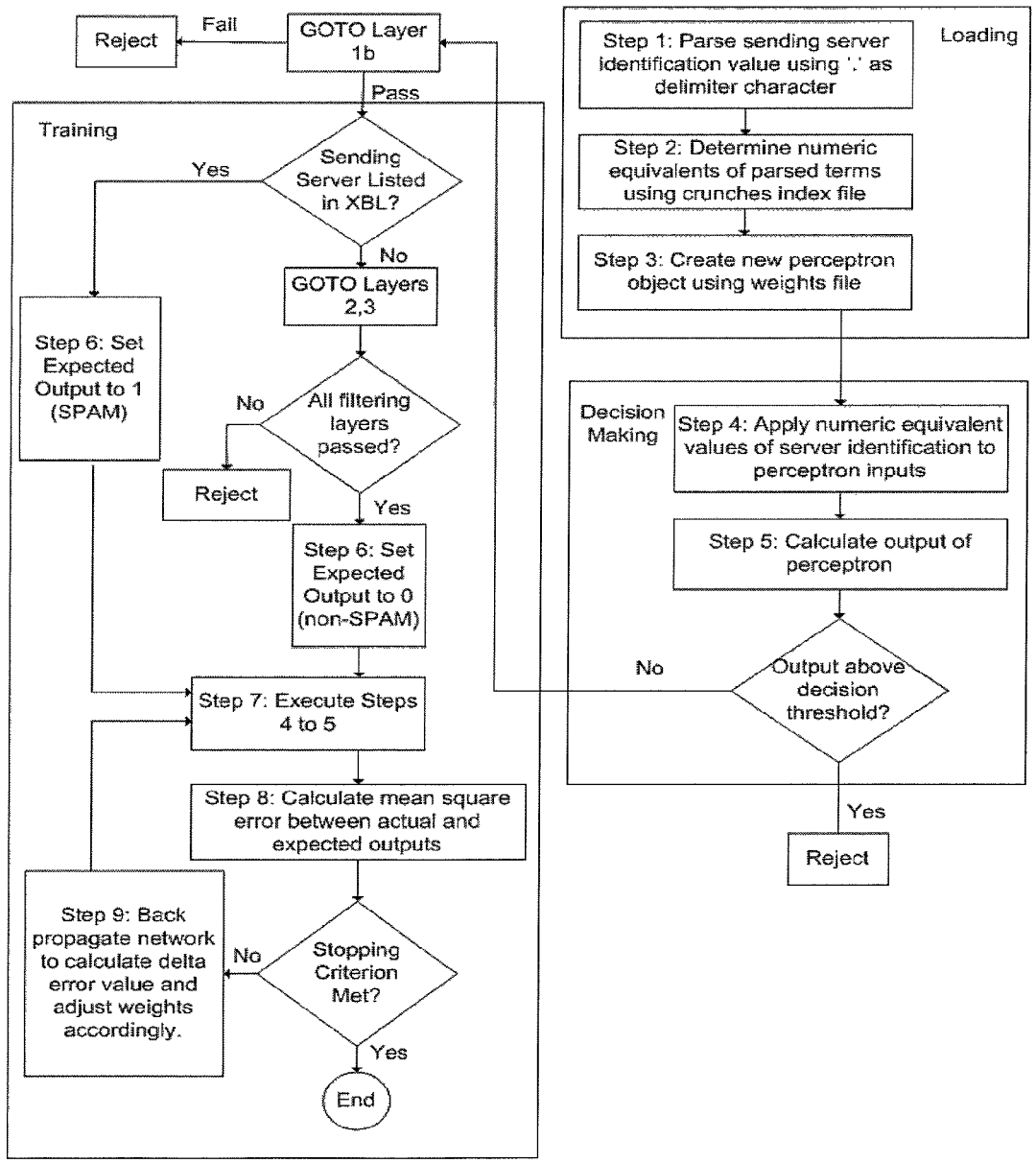
FIG. 5 is a flow chart representing the information flow of the Perceptron module.
Figure 6:
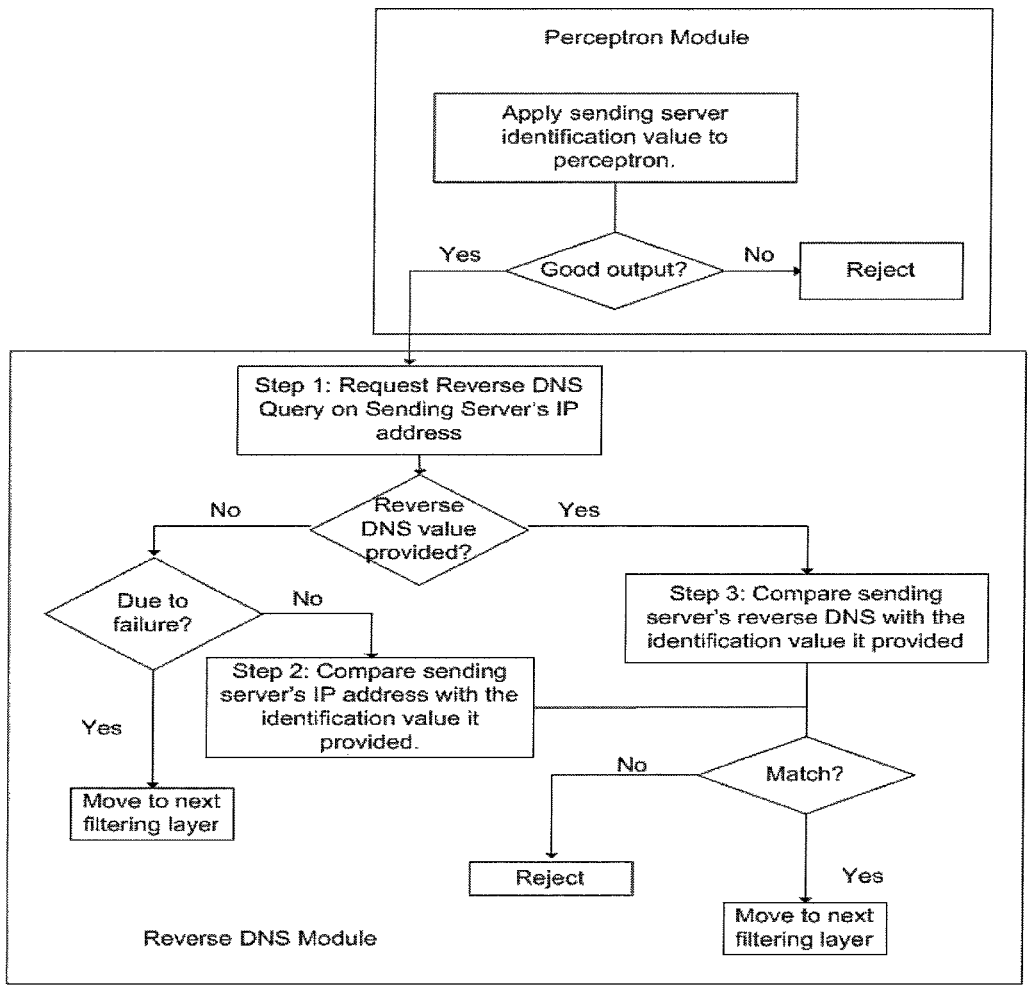
FIG. 6 is a flow chart representing the information flow of the reverse Domain Name Service (DNS) module.

The processor 206 on the server 202 is able to perform the flow logic defined in FIGS. 5 and 6. Referring to FIG. 5, according to the present embodiment of the present invention, the perceptron training algorithm is broken up into three main areas. The first area is called 'loading' and is responsible for creating a new perceptron object, loading its weight values and generating its inputs. The second area is called 'decision making' where based on the given inputs, the perceptron must decide whether to accept or reject the current SMTP transaction. The third area is called 'training', which is responsible for training the perceptron to learn legitimate and spam zombie identification values.

The purpose of the loading portion of the algorithm is to create a new perceptron object, initialize its weight values and convert the provided input into a corresponding tokenized array reference. Specifically, in Step 1 of FIG. 5, the algorithm is provided with the sending server's identification value as its input and parses the input into sub-domains, using the '.' as a delimiter. For example, a server identification value of static.mail.example.com would be parsed into the new separate terms static, mail, example and com. In Step 2, each sub domain term is then stored in an index file on the filtering server and assigned a corresponding numeric/index value. For example, the server identification of static.mail.example.com could be tokenized with assigned indexes such as 1, 2, 3 and 4. In an alternate embodiment, each sub domain term is stored with an associative index along with additional statistical data such as frequency count.

Next, in Step 3, a new perceptron object is created and initialized with pre-defined weights, learning rate and maximum iteration count. The pre-defined weights for each input of the perceptron are stored in a file on the filtering server and are the most recent weights used by the last perceptron object created. The maximum iteration count variable is used to prevent the new perceptron from spending a long period of time training a given set of input, which could affect performance of the new filtering technique.

Once Step 3 of FIG. 5 is completed, the new perceptron is ready to either learn or make a decision. The decision making portion of the new algorithm is invoked after a new perceptron is created. Specifically, in Step 4 of FIG. 5, the tokenized values of each sub domain from the server identification value are applied to the inputs of the perceptron.

In Step 5, the algorithm calculates the net-sum for the perceptron and subsequently applies the net-sum value to an activation function, such as a sigmoid function, to calculate the output. This output value is then used to determine whether the server identification value is to be accepted. Specifically, if the output value is below the decision threshold of the activation function (i.e. 0.5 for sigmoid) then the SMTP transaction passes through the new perceptron filtering and is subsequently verified against the reverse DNS check layer. If however, the output value is above the decision threshold value, the SMTP transaction is blocked.

The training portion is executed after the creation of a new perceptron and after the perceptron's decision module and reverse DNS module have decided that the current sending server provided a legitimate server identification value. Specifically, the training algorithm begins by determining whether the sending server's IP address is listed in the Spamhaus XBL. The Spamhaus XBL is designed to list the IP addresses that are sending spam through illegal third party exploits, in other words, spam zombies. In Step 6, if the sending server's IP address is on the Spamhaus XBL then the expected output of the new perceptron is set to '1' to indicate that the sending server is a known malicious host. If however, the sending server is not listed in the Spamhaus XBL then control is passed to the final 2 layers of filtering on the filtering server. If the current SMTP transaction passes the final two layers of filtering and the sending server's IP address was not listed in the Spamhaus XBL, then in Step 6, the expected output of the new perceptron is set to '0' to indicate that the sending server is likely to be trusted. For the training algorithm, Steps 7 and 8 of FIG. 5 are executed. Step 9 indicates that steps 7 to 8 are repeated until a stopping criterion is met. Once a stopping criterion is met, training is complete. the new stopping criterion occurs when the perceptron output equals the expected output or a maximum number of iterations have elapsed.

Referring to FIG. 6, the new filtering system will only execute the new reverse DNS module if the SMTP transaction being analyzed has passed the new perceptron module (i.e. Layer 1a). The reverse DNS module begins with Step 1 in FIG. 6 where the module performs a DNS query for the sending server's IP address. Specifically, the query will look for the reverse DNS record (PTR record) of the sending server. If the reverse DNS query did not respond with a value due to a query failure, then it is inconclusive as to whether the source is potentially legitimate or not and as such, the code exits the new technique and proceeds to the next layer of filtering. If however, the sending server does not have a reverse DNS record and an NXDOMAIN error message was returned, then no reverse DNS mapping exists for the sending server's IP address and code. At this point, the new reverse DNS module then proceeds to Step 2.

In Step 2, the reverse DNS module verifies that the sending server behaviour was consistent with RFC 2821 by specifying an address literal as its server identification value. Specifically, the new code compares the sending server's IP address with the identification value the sending server specified. If there is no match then the SMTP transaction is rejected and if there is a match then the code exits the new technique and proceeds to the next layer of filtering in the anti-spam server. If however, a reverse DNS mapping exists, then the code proceeds to Step 3, which will compare the reverse DNS value with the server's identification value to determine whether the two match. If there is no match then the SMTP transaction is rejected and if there is a match then the code exits the new technique and proceeds to the next layer of filtering of the new filtering server. The code may also extract Uniform Resource Identifiers (URIs) embedded in e-mails rejected by the system and utilized them to populate a URI blacklist, which is well known to a worker of skill in the art.

The test environment used to test the filtering technique consisted of a live production inbound mail filtering server located in the de-militarized zone (DMZ) of a corporate network, which was responsible for filtering mail for the corporate domain comprising over 35,000 distinct e-mail accounts. Specifically, testing was conducted in March 2007, when the mail filtering servers blocked a total of 16,364,263 e-mails between Feb. 9, 2007 to Mar. 11, 2007.

Figure 7:
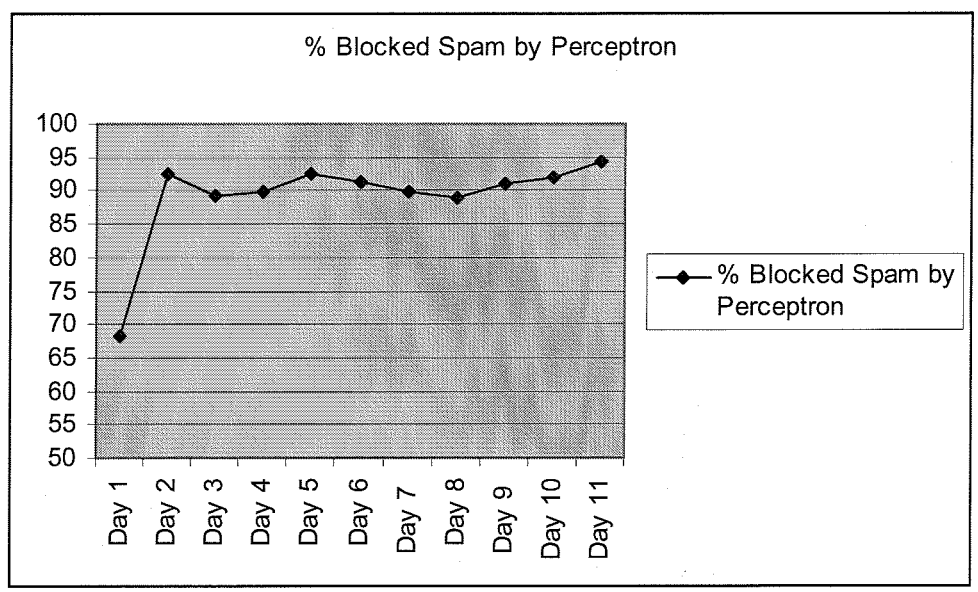
FIG. 7 is a chart representing blocking effectiveness of the Perceptron module.

Through experimentation, it was observed that the perceptron, according to the present embodiment of the present invention required a single full day of training in order to achieve high, stable blocking rates. Referring to FIG. 7, it should be noted that on the first day of training, the blocking rate was at approximately 66% whereas the blocking rate on the subsequent days increased to a range between 88-95% with a zero false positive rate.

In theory, the perceptron should be able to detect spam zombies that are listed in the blacklist as well as zombies that are not already listed on the blacklist. In order to determine whether the perceptron can detect spam zombies that the Spamhaus XBL cannot, a script was created to extract the IP addresses of all SMTP connections that were blocked by the perceptron. For each IP address, the script would query the Spamhaus XBL to determine if said server was listed on the Spamhaus list or not.

As seen in the data from Table 1, May 28, 2007, was used as a baseline. Specifically, on May 28th, a script was executed against each of the logs from the previous seven days where for each day's log file, the script would extract the IP addresses of the servers blocked by the perceptron and determine whether the address was listed in the Spamhaus XBL or not.

TABLE 1

Results - Generalization Validation

| Date | Number of Perceptron Blocks Listed on the Spamhaus List on May 28 | Number of Perceptron Blocks Not Listed on the Spamhaus List on May 28 |
| --- | --- | --- |
| 22-May | 3882 | 924 |
| 23-May | 3855 | 924 |
| 24-May | 3998 | 884 |
| 25-May | 3986 | 1056 |
| 26-May | 3459 | 405 |
| 27-May | 3738 | 465 |
| 28-May | 3382 | 721 |

Although the machine learning algorithm relies on the Spamhaus XBL to learn bad mail server behaviour, the results in Table 1 show that the algorithm is able to generalize said list. Specifically, in addition to detecting sources listed in the Spamhaus XBL, the algorithm was able to detect several hundred servers that were not already listed in said list. As such, the machine learning algorithm provides added value over the Spamhaus list.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for detecting malicious e-mails from spam sources, the system comprising:
    a processor operable to implement a first layer of spam filtering, the first layer of spam filtering comprising the steps of processing a sending server identification value of a sending source by separating the sending server identification value into one or more domain level terms to allow each unique term to be tokenized with an index value and applying the one or more tokenized values as a learning feature in a learning algorithm trained to identify spam sources;
    the processor further being operable to perform a second layer of spam filtering, on any emails that are not identified as spam by the first layer of spam filtering, the second layer of spam filtering comprising the steps of implementing a reverse DNS lookup based on an IP address of the sending source to determine a domain name associated with the IP address of the sending source, and comparing the domain name associated with the IP address of the sending source with the sending server identification value to determine if the domain name associated with the IP address of the sending source matches the sending server identification value; and
    the processor further being operable to perform a third layer of spam filtering, on any emails that are not identified as spam by the first and second layers of spam filtering, the third layer of spam filtering comprising the steps of implementing content filtering to detect spam based on email content; and
    providing feedback from the second and third layers of spam filtering to the learning algorithm of the first layer of spam filtering to enable the learning algorithm of the first layer of spam filtering to learn sending server identification values of sources that are sending spam;
    wherein the first, second, and third layers of spam filtering are applied sequentially such that the first layer of spam filtering is applied first, only email not identified by the first layer as spam is filtered by the second layer of spam filtering, and then only email not identified as spam by the second layer is filtered by the third layer of spam filtering, to minimize the number of email messages which are processed by the content filtering layer of spam filtering.

2. A system according to claim 1, wherein the e-mail is rejected if the system identifies the sending source as a spam source.

3. A system according to claim 2 wherein the e-mail rejected by the system are parsed to extract one or more embedded URI(s) and the one or more URI(s) are utilized to populate a URI blacklist.

4. A system according to claim 1, wherein the learning algorithm is a supervised machine learning algorithm trained by a good supervisor and a bad supervisor to update learning parameters in the form of statistical values such as input weights.

5. A system according to claim 4, wherein the bad supervisor is a compromised machine blacklist and is used to train the system when the sending source is listed in the blacklist.

6. A system according to claim 4, wherein the good supervisor is used to train the learning algorithm when the first through third layers of spam filtering do not identify an e-mail as spam.

7. A system according to claim 1, wherein each tokenized value is associated with one or more statistical data value(s) such as a frequency value.

8. A system according to claim 1, wherein the e-mail is rejected if the reverse DNS and sending source values are inconsistent or a reverse DNS value does not exist.

9. A system according to claim 8, wherein the e-mail rejected by the system are parsed to extract one or more embedded URI(s) and the one or more URI(s) are utilized to populate a URI blacklist.

10. A non-transitory computer readable medium containing data and instructions which, when loaded into one or more processors, configures the processors to implement a method for detecting malicious e-mails from spam sources, the method comprising the steps of:
    implementing a first layer of spam filtering, the first layer of spam filtering comprising the steps of:
        processing, by a spam detection process running on a spam detection server, a server identification value of a sending source by separating the value into one or more domain level terms;
        tokenizing, by the spam detection process, each domain level term with an index value; and
        applying, by the spam detection process, the one or more tokenized values as a learning feature in a learning algorithm trained to identify spam sources;
    implementing a second layer of spam filtering, on any emails that are not identified as spam by the first layer of spam filtering, the second layer of spam filtering comprising the steps of:
        implementing a reverse DNS lookup based on an IP address of the sending source to determine a domain name associated with the IP address of the sending source; and
        comparing the domain name associated with the IP address of the sending source with the sending server identification value to determine if the domain name associated with the IP address of the sending source matches the sending server identification value;
    implementing a third layer of spam filtering, on any emails that are not identified as spam by the first and second layers of spam filtering, the third layer of spam filtering comprising the step of implementing content filtering to detect spam based on email content; and
    providing feedback from the second and third layers of spam filtering to the learning algorithm of the first layer of spam filtering to enable the learning algorithm of the first layer of spam filtering to learn sending server identification values of sources that are sending spam;
    wherein the first, second, and third layers of spam filtering are applied sequentially such that the first layer of spam filtering is applied first, only email not identified by the first layer as spam is filtered by the second layer of spam filtering, and then only email not identified as spam by the second layer is filtered by the third layer of spam filtering, to minimize the number of email messages which are processed by the content filtering layer of spam filtering.

11. The computer-readable medium of claim 10, wherein the first layer of spam filtering further comprises the step of comparing, by the spam detection process, the output of the learning algorithm with a threshold value and rejecting the e-mail when the output is above the threshold.

12. The computer-readable medium of claim 11, wherein the e-mail rejected by the spam detection process are parsed to extract one or more embedded URI(s) and the one or more URI(s) are utilized to populate a URI blacklist.

13. The computer-readable medium of claim 10, wherein the e-mail is rejected when the reverse DNS and sending source values are inconsistent or a reverse DNS value does not exist.

14. The computer-readable medium of claim 13, wherein the e-mail rejected by the system are parsed to extract one or more embedded URI(s) and the one or more URI(s) are utilized to populate a URI blacklist.

15. The computer-readable medium of claim 10, further comprising the step of adjusting learning parameters of the learning algorithm, by the spam detection process, until the output of the learning algorithm is consistent with an expected output value.

16. The computer-readable medium of claim 15, wherein the expected output value implies spam if the e-mail is flagged by a bad supervisor and the expected output value implies non-spam if the e-mail passes a good supervisor.

17. The computer-readable medium of claim 16, wherein the bad supervisor is a compromised machine blacklist and is used when the sending source is listed in the compromised machine blacklist.

* * * * *